United States Patent
Onozawa et al.

(10) Patent No.: US 6,713,419 B1
(45) Date of Patent: Mar. 30, 2004

(54) OPTICAL GLASS FOR PRECISION PRESS MOLDING AND OPTICAL ELEMENT

(75) Inventors: Masahiro Onozawa, Sagamihara (JP); Takehiro Sakamoto, Sagamihara (JP)

(73) Assignee: Kabushiki Kaisha Ohara, Sagamihara (JP)

(*) Notice: Subject to any disclaimer, the term of this patent is extended or adjusted under 35 U.S.C. 154(b) by 0 days.

(21) Appl. No.: 09/787,381

(22) PCT Filed: Oct. 8, 1999

(86) PCT No.: PCT/JP99/05565
§ 371 (c)(1), (2), (4) Date: Mar. 19, 2001

(87) PCT Pub. No.: WO00/21895
PCT Pub. Date: Apr. 20, 2000

(30) Foreign Application Priority Data

Oct. 12, 1998 (JP) .......................... 10-289765

(51) Int. Cl.$^7$ ............................. C03C 3/068
(52) U.S. Cl. .................. 501/78; 501/79; 501/903
(58) Field of Search ............. 501/64, 78, 79, 501/903

(56) References Cited

U.S. PATENT DOCUMENTS

| | | | |
|---|---|---|---|
| 4,469,800 A | * | 9/1984 | Boudot et al. ............... 501/43 |
| 4,732,876 A | * | 3/1988 | Nagamine et al. ........... 501/78 |
| 5,607,886 A | | 3/1997 | Onozawa |
| 6,251,813 B1 | * | 6/2001 | Sato ............................. 501/78 |

FOREIGN PATENT DOCUMENTS

| | | |
|---|---|---|
| DE | 42 22 322 C1 | 12/1993 |
| DE | 42 22 324 A1 | 1/1994 |
| DE | 19919304 | 11/1999 |
| EP | 552 932 A  * | 7/1993 |
| GB | 1 410 073 | 10/1975 |
| JP | 48-61517 | 8/1973 |
| JP | 54-3115 | 1/1979 |
| JP | 60-221338 | 11/1985 |
| JP | 5-58669 | 3/1993 |
| JP | 6-122526 | 5/1994 |
| JP | 07041334 A  * | 2/1995 |
| JP | 8217484 | 2/1995 |
| JP | A 8-59281 | 3/1996 |
| JP | 8-319124 | 12/1996 |
| JP | 2000016831 | 1/2000 |

\* cited by examiner

*Primary Examiner*—David Sample
(74) *Attorney, Agent, or Firm*—Oliff & Berridge, PLC

(57) ABSTRACT

An optical glass for precision press molding that has desired optical constants, a low glass transformation point (Tg), and a devitrification temperature that is lower than a temperature of a glass melt, at which a viscosity suitable for forming of a preform material is obtained, is provided. The optical glass for precision press molding has a lanthanum borosilicate system glass having optical constants of refractive index (nd) within a range from 1.65 to 1.73 and Abbe number (vd) within a range from 50 to 60, a Tg within a range of 480–580° C. The optical glass for precision press molding has a devitrification temperature that is lower than a temperature of the glass melt when the glass melt has a viscosity $\eta$ (poise) of log $\eta$=2.5. The optical glass for precision press molding has a specific composition range of $SiO_2$—$B_2O_3$—$La_2O_3$—$Y_2O_3$—$Ta_2O_5$—$CaO$—$Li_2O$ system composition.

14 Claims, 1 Drawing Sheet

OPTICAL GLASS FOR PRECISION PRESS MOLDING AND OPTICAL ELEMENT

TECHNICAL FIELD

The present invention relates to a preform material applied to a precision press molding, and to an optical glass for precision press molding, which is suitable for a precision press molding with the preform material, and to an optical element.

BACKGROUND ART

Recently, optical devices are remarkably miniaturized and performance thereof is becoming remarkably higher. Thus, optical elements, such as lenses or the like, which are used for the optical devices, are also required to lighten, miniaturize and have high performance. Uses of aspherical lenses can decrease the number of lenses to be used and, for this reason, the uses of aspherical lenses are becoming the mainstream in designs of various kinds of optical devices.

As a producing method for the aspherical lenses, a so-called precision press molding is becoming the mainstream. In the precision press molding, a preform material obtained from a gob or a glass block is heated to soften, and then press-formed in a mold having a precise surface. The method can omit a grinding or polishing process for a lens after forming, which is a character of the method. Thereby the optical elements, such as lenses or the like, can be mass-produced at a low cost.

In order to achieve the object of the mass production at a low cost in the producing method by the precision press molding, a mold used for the precision press molding is desired to be capable of repeated uses. For that purpose, a temperature during the precision press molding should be as low as possible so that oxidation of the surface of the mold will be suppressed as little as possible by using a glass having a low-temperature softening property, that is, a glass having a low glass transformation point (Tg).

At present, the upper limit temperature, which is determined by a heat-resistance temperature of the mold, for the precision press molding is from 650 to 700° C. Accordingly, the upper limit of the glass transformation point (Tg) is about from 550 to 600° C., however, it is preferable to be as low as possible for suppressing progress of the surface oxidation of the mold and lengthening a life of the mold.

On the other hand, the glass that is used for the aspherical lens of the optical device is required to have various optical constants. Particularly, the glass having optical constants of refractive index (nd) of about from 1.65 to 1.73 and Abbe number (vd) of about from 50 to 60 is required. Conventionally, as a glass having such optical constants, a lanthanum borate system composition has been typically known. For example, various glasses are disclosed in Japanese Patent Application Laid-open No. Sho 48-61517, Japanese Patent Application Laid-open No. Sho 54-3115 or the like. However, these glasses generally have high glass transformation point, so that these are unsuitable for a glass for precision press molding.

As for a producing method for the preform material, a method in which a glass melt is dropped from a tip of an efflux pipe, the dropped glass is received and formed in a mold or the like, and then it is cooled for obtaining the preform material has been known. Typical examples for obtaining the preform by this method are disclosed in Japanese Patent Application Laid-open No. Hei 6-122526, Japanese Patent Application Laid-open No. Hei 8-319124 or the like.

According to this method, mass-productivity is high and a production cost is the lowest at present. Furthermore, the preform material obtained by the method has a spherical or biconvex lens-like shape near a final shape of the lens. Thus, variations in shape of the preform material can be reduced during the precision press molding, so that the method has an advantage that a mass-productivity of lenses themselves, which will be finally obtained, can be improved.

On the other hand, another method for obtaining the preform material by cutting a glass block material has been known. However, after the block material is cut, this method requires a process for the cut block material to have a ball shape. If the process is not carried out, when the block material is formed from a rectangular solid to the lens shape, variations in shape increase, and then it takes a time for forming. Accordingly, the former forming method, in which the glass melt is dropped, is remarkably superior in the cost and the mass-productivity.

With the forming method, in which the glass melt is dropped, if the viscosity of the glass melt is too low, it is difficult to obtain the preform material having a smooth curved surface and the shape near the spherical or biconvex lens-like.

On the other hand, if the viscosity of the glass melt is too high, control for a dropping state of the glass melt, which is continuously flowed from the tip of the efflux pipe, becomes difficult. Thus, separating of only an amount required for one forming becomes also difficult, so that the producing of the preform material becomes difficult.

In addition, the glass is required to have a devitrification temperature that is lower than a temperature of the glass melt during the producing of the preform material. That is, if the viscosity of the glass melt is lower than the desired value, the lowering of temperature is required for increasing the viscosity of the glass melt because of the above-described reason. If the devitrification temperature is higher than the glass melt temperature at which the desired viscosity is obtained, lowering of the glass melt temperature for obtaining the desired viscosity causes occurrence of crystallite in the glass melt. As a result, devitrification occurs in the preform material, so that the preform material may not be used for the optical glass. Particularly, such a tendency becomes significant with the glass having a low viscosity.

Explaining more concretely, if the devitrification temperature is high, the devitrification occurs in the glass melt at the tip of the efflux pipe at a temperature at which the viscosity becomes such as to enable the forming of the preform material by dropping. As a result, the devitrification is contained on a surface or inside of the preform material, thus a yield of the preform material reduces extremely. For avoiding this, every constant time (about one to three hours), the temperature of the tip of the efflux pipe should be increased to a temperature at which the devitrification disappears. Therefore, continuous and stable production of the preform materials, which have high qualities, by the dropping method is extremely difficult.

Japanese Patent Application Laid-open No. Sho 60-221338 discloses a lanthanum borate system optical glass having a low glass transformation point, while Japanese Patent Application Laid-open No. Hei 5-58669 discloses a lanthanum borate system optical glass suitable for precision press molding. These glasses, however, have a devitrification temperature that is higher than a temperature at which the viscosity suitable for the production of the preform materials is obtained. Thus, the problem as described above arises.

On the other hand, when the viscosity of the glass melt is higher than the desired value for the forming of the preform, the temperature of the glass melt is increased for decreasing the viscosity, so that the problem for the devitrification does not arise. However, a problem of seizing of the glass melt in the mold for the preform materials arises, or a problem of early exhaustion of the mold by the surface oxidation of the mold arises. According to experiments, when the preform materials are formed not more than 950° C., these problems do not arise.

That is, in addition to the low glass transformation point as previously described, the optical glass for precision press molding is preferable to have a devitrification temperature that is lower than the temperature of the glass melt, at which the viscosity suitable for the forming of the preform materials is obtained. Furthermore, it is preferable that the temperature of the glass melt, at which the viscosity suitable for the forming is obtained, is as low as possible in view of a heat-resistant temperature of the mold, which is used for forming of the preform.

In addition, a glass including PbO component is liable to fuse with the mold during the precision press molding. Therefore, repeated uses of the mold are difficult. Thus, such a glass is unsuitable for the optical glass for precision press molding.

Furthermore, a glass including $F_2$ component causes clouds in the preform material because the $F_2$ component is selectively volatilized from a surface layer of the glass melt during the forming of the preform material. With the glass including $F_2$ component, the $F_2$ component volatilizes to deposit on the mold during the precision press molding of the preform material, generating clouds on the surface of the mold. From such reasons, the glass including $F_2$ component is unsuitable for the optical glass for precision press molding.

An object of the present invention is, by solving the problems of the conventional glass, to provide an optical glass for precision press molding that has optical constants of refractive index (nd) within a range from 1.65 to 1.73 and Abbe number (vd) within a range from 50 to 60, and a low-temperature softening property, that is, a low glass transformation point (Tg), and that is excellently resistant to devitrification property and has a devitrification temperature that is lower than a temperature of glass melt, at which a viscosity suitable for forming of a preform material is obtained. Another object of the present invention is to provide an optical glass for precision press molding, which is free of PbO component and $F_2$ component besides having above-described properties. Further object of the present invention is to provide an optical element.

DISCLOSURE OF THE INVENTION

In order to accomplish the objects, the inventors repeatedly carried out experiments of forming of a preform material by dropping a glass melt of lanthanum borosilicate system glass. As a result, the inventors found that a viscosity η (poise) range of the glass melt, which is suitable for the forming of preform material by dropping, is a range of log η=from 1.5 to 2.5.

In addition, in order to obtain a stable glass that has no devitrification within the above-described viscosity η (poise) range of the glass melt, $Y_2O_3$ was tried to coexist with the composition system having SrO component and $ZrO_2$ and/or $Ta_2O_5$ component as disclosed by the Japanese Patent Application Laid-open No. Hei 5-58669. However, unexpectedly, a stable glass was not obtained. With a composition system having $Y_2O_3$ component, it was found that additionally coexisting of CaO with the $Y_2O_3$ component improves the devitrification temperature not less than 100° C. compared with the conventional glass. That is, it was found that within a very limited specific composition range of $SiO_2$—$B_2O_3$—$La_2O_3$—$Y_2O_3$—$Ta_2O_5$—CaO—$Li_2O$ system composition, an optical glass is obtained optical constants within the desired ranges and a low glass transformation point, and is much excellently resistant to devitrification property, and that is synthetically superior in some properties required for the production of the preform material and the precision press molding. Thus, the inventors have achieved the present invention.

According to one aspect of the present invention, an optical glass for precision press molding according to the present invention comprises a lanthanum borosilicate system glass having optical constants of refractive index (nd) within a range from 1.65 to 1.73 and Abbe number (vd) within a range from 50 to 60; and a glass transformation point (Tg) within a range of 480–580° C. The optical glass for precision press molding has a devitrification temperature that is lower than a temperature of a glass melt when the glass melt has a viscosity η (poise) of log η=2.5. The devitrification temperature means that a temperature at which crystallite occurs when the temperature of the glass melt, which is in a transparent state, is reduced.

The optical glass for precision press molding may comprise the following composition in weight percent of:

| | |
|---|---|
| $SiO_2$ | 10–20% |
| $B_2O_3$ | 23–35% |
| $SiO_2 + B_2O_3$ | 36–50% |
| $La_2O_3$ | 10–21% |
| $Y_2O_3$ | 5–15% |
| $Gd_2O_3$ | 0–10% |
| $La_2O_3 + Y_2O_3 + Gd_2O_3$ | 15–40% |
| $Ta_2O_5$ | 1–10% |
| $ZrO_2$ | 0–8% |
| CaO | 5–20% |
| ZnO | 0–10% |
| SrO | 0–20% |
| BaO | 0–20% |
| ZnO + CaO + SrO + BaO | 10–35% |
| $Y_2O_3 + Ta_2O_5 + CaO$ | not less than 14% |
| $Li_2O$ | 2.5–8% |
| $Sb_2O_3$ | 0–1%. |

The optical glass for precision press molding may comprise the following composition in weight percent of:

| | |
|---|---|
| $SiO_2$ | 10–20% |
| $B_2O_3$ | 23–35% |
| $SiO_2 + B_2O_3$ | 36–50% |
| $La_2O_3$ | 10–18% |
| $Y_2O_3$ | 5–15% |
| $Gd_2O_3$ | 0–10% |
| $La_2O_3 + Y_2O_3 + Gd_2O_3$ | 15–40% |
| $Ta_2O_5$ | 1–10% |
| $ZrO_2$ | 0–8% |
| CaO | 5–20% |
| ZnO | 0–10% |
| SrO | 0–20% |
| BaO | 0–20% |
| ZnO + CaO + SrO + BaO | 10–35% |
| $Y_2O_3 + Ta_2O_5 + CaO$ | not less than 14% |
| $Li_2O$ | 2.5–8% |
| $Sb_2O_3$ | 0–1%. |

According to another aspect of the present invention, an optical element according to the present invention is obtained by precision press molding an optical glass that comprises a lanthanum borosilicate system glass having optical constants of refractive index (nd) within a range from 1.65 to 1.73 and Abbe number (vd) within a range from 50 to 60; and a glass transformation point (Tg) within a range of 480–580° C. The optical glass has a devitrification temperature that is lower than a temperature of a glass melt when the glass melt has a viscosity η (poise) of log η=2.5. The devitrification temperature means that a temperature at which crystallite occurs when the temperature of the glass melt, which is in a transparent state, is reduced.

PREFERRED EMBODIMENT OF THE INVENTION

Figure 1:
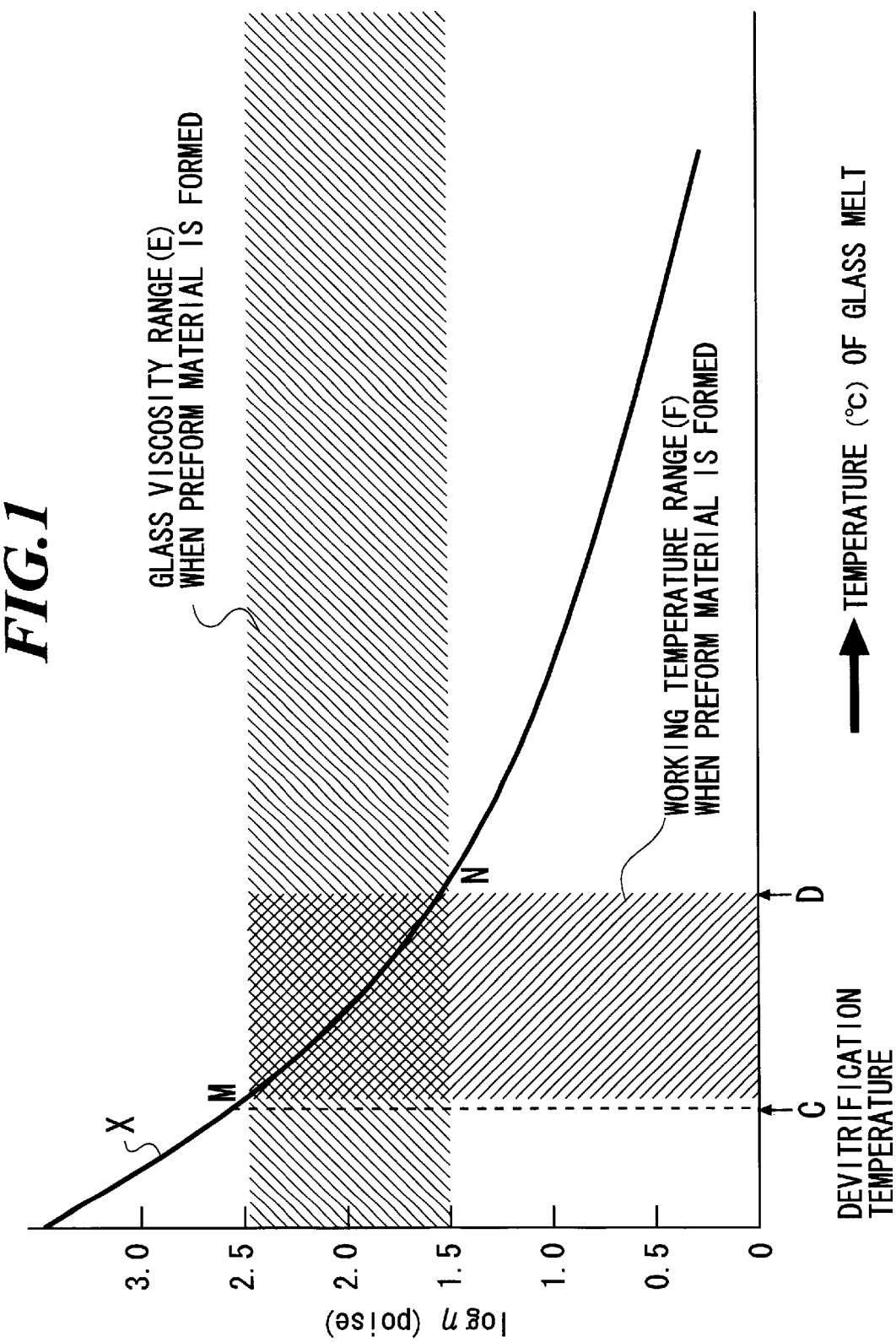
FIG. 1 is a view showing a relationship between a temperature and a viscosity of a glass melt.

The reasons for limiting the composition range of respective components of the optical glass for precision press molding according to the present invention to the above-described ranges are the following.

That is, the $SiO_2$ component, which is for forming a glass, should be included in the optical glass not less than 10% for improving the resistance to devitrification property of the glass and maintaining a chemical durability. However, if the amount exceeds 20%, it becomes difficult to maintain the low-temperature softening property.

The $B_2O_3$ component, which is for forming a glass, is effective for imparting the low-temperature softening property to the glass. The amount should be within a range of 23–35% for maintaining the resistance to devitrification property of the glass and the chemical durability.

However, the total amount of the $SiO_2$ component and the $B_2O_3$ component should be within a range of 36–50% for maintaining the resistance to devitrification property and the target optical constants.

The $La_2O_3$, $Y_2O_3$ and $Gd_2O_3$ components are effective for increasing the refractive index of the glass and lowering dispersion.

The $La_2O_3$ component should be included in the optical glass not less than 10% for obtaining the desired value of the refractive index of the glass, whereas the amount should be not more than 21% for maintaining the resistance to devitrification property. Particularly, the amount of not more than 18% is preferable for obtaining the glass that is superior in the resistance to devitrification property.

The $Y_2O_3$ component is essential because the $Y_2O_3$ component increases the refractive index and has an effect on improvement in the resistance to devitrification property of the glass besides. However, if the amount is less than 5%, it becomes difficult to obtain the desired resistance to devitrification property, on the contrary, if the $Y_2O_3$ component is included exceeding 15% in the glass, the glass rather becomes liable to devitrify.

The $Gd_2O_3$ component may be included arbitrarily for adjusting the optical constants. The amount should be limited up to 10% for maintaining the resistance to devitrification property.

Furthermore, for maintaining the target optical constants and for obtaining a glass that is more stable against the devitrification, the total amount of these three components should be within a range of 15–40%.

$Ta_2O_5$ component greatly improves the resistance to devitrification property of the glass, so that it is an essential component of the glass of the present invention. However, if the amount is less than 1%, a remarkable effect is not obtained, whereas if the amount exceeds 10%, the glass rather becomes liable to devitrify.

The $ZrO_2$ component may be included arbitrarily for adjusting the optical constants and improving the chemical durability of the glass. However, the amount should be not more than 8% for maintaining the resistance to devitrification property.

The ZnO component has an effect for improving especially waterproof property among the chemical durability of the glass. Furthermore, with a composition system glass having small amount of the $Li_2O$ component, the ZnO component has a great effect on lowering the glass transformation point without deteriorating the chemical durability. Thus, in order to obtain these effects, the ZnO component may be arbitrarily added to the glass of the present invention, whereas the amount should be not more than 10% for maintaining the resistance to devitrification property.

The CaO, SrO and BaO components may be added up to 20% respectively, for adjusting the optical constants and stabilization of the glass. If the amount exceeds 20%, the glass rather becomes liable to devitrify; besides, the chemical durability of the glass deteriorates. Particularly, the CaO component is an essential component, because it has a great effect on improvement of the resistance to devitrification property of the glass. The amount of the CaO component should be not less than 5% for obtaining the glass that is more stable against the devitrification.

Furthermore, when the total amount of the CaO component, which is essential, and the ZnO, SrO and BaO components is within a range of 10–35%, the resistance to devitrification property of the glass becomes the best. The total amount includes one or more components among the respective ZnO, SrO and BaO components.

With the present invention, coexisting of the three components of $Y_2O_3$, $Ta_2O_5$, and CaO with one another is particularly important for obtaining the glass being excellently resistant to devitrification property, which is different from the conventional glass. The content ranges of the respective components are described above. Furthermore, by including the total amount of these three components not less than 14%, the glass becomes stable in view of the resistance to devitrification property. That is, no devitrification occurs within the temperature range of the glass melt, wherein the viscosity η (poise) of the glass melt is suitable for producing the preform material by dropping, that is, the range of log η equal from 1.5 to 2.5.

The $Li_2O$ component is an important component for improving the melting property and the resistance to devitrification property of the glass, and for imparting the low-temperature softening property to the glass. The glass transformation point of not more than 580° C., which is a physical characteristic desired for the optical glass for precision press molding, can be obtained by including the $Li_2O$ component in the glass of the present invention. For obtaining these effects, the $Li_2O$ component should be included in the glass not less than 2.5%, whereas if the amount exceeds 8%, both the chemical durability and the resistance to devitrification property of the glass deteriorate.

The $Sb_2O_3$ component may be added arbitrarily as a refining agent in melting the glass. The amount of this component of not more than 1% suffices.

Other components, which are not recited in claims, were added to the glass of the present invention, and stability of the glass was examined. As a result, it was found that when the $Al_2O_3$, MgO, $Na_2O$, or $K_2O$ component is added, the stability of the glass deteriorates rapidly. Thus, the desired resistance to devitrification property cannot be obtained. That is, each component of these should not be included in the glass of the present invention in order to obtain the stable glass.

When the glass has the above-described composition, a glass having the properties of the glass melt can be obtained, which is the object of the present invention.

It is concretely explained based on FIG. 1. E shows a desired viscosity range of log η equal from 1.5 to 2.5 during the forming of the preform material.

A solid line X in FIG. 1 shows a relationship, which is an example, between the temperature and the viscosity of the glass melt of the optical glass, which has the above-described composition, of the present invention. From M to N portion where the solid line X overlaps with the E is corresponding to the preferred temperature of the glass melt during the production of the preform from the glass. The preferred temperature of the glass melt is determined by the viscosity.

With the glass according to the present invention, the devitrification temperature, which is shown by the solid line X, of the glass melt is a point of C that is lower than the temperature corresponding to M. Thus, when the forming of the preform material is carried out while controlling the temperature of the glass melt so that the viscosity will become a range of not more than log η=2.5, the glass does not devitrify.

A temperature of a point of D, which is corresponding to N, is not limited. Preferably, the point of D is lower than about 950° C. so as to prevent the glass from fusing with the mold used for forming of the preform material. In this case, the forming operation for the preform material may be carried out within the temperature range of from M to N.

However, the point of D may be higher than about 950° C. in the present invention. In this case, the forming of the preform material may be carried out within the range of M to N and at a temperature that is lower than about 950° C.

Thereafter, the obtained preform material is heated to soften, and then press-formed in the mold having a precise surface, that is, precision press molding. Thereby, an optical element, such as lens or the like, is obtained.

EXAMPLE

Hereinafter, examples according to the present invention will be explained, however, the present invention is not limited to these examples.

Table 1 shows compositions of examples (No.1 to No.15) of the optical glass for precision press molding according to the present invention. Table 2 shows refractive index (nd), Abbe number (vd), a glass transformation point (Tg), results of devitrification tests, and temperatures of glass melt when the viscosity η (poise) of the glass melt is log η=1.5 and 2.5, of each glass obtained by each examples.

Table 3 shows compositions of comparative examples (No.1 to No.6) of the conventional optical glasses described above, and also physical characteristics and test results, which are the completely same items as shown in Table 2, of these comparative examples.

For the optical glasses for precision press molding of the examples No.1 to No.15, normal optical glass raw materials, such as oxides, carbonates, nitrates or the like, were weighed and mixed at the predetermined ratio for composition ratios of Table 1. Then, they were put into a platinum crucible and molten at a temperature of 1000–1300° C. for two to four hours according to difficulty of the melting property depending on the composition of the glass and then it was stirred and homogenized. Thereafter its temperature was lowered to appropriate one, and it was cast in a mold or the like and annealed. Thereby, the optical glasses for precision press molding of the examples No.1 to No.15 were easily obtained.

For the devitrification tests, a sample of 100 g of the optical glass for precision press molding of each example obtained as described above was put into platinum crucible of 50 cc. Each sample was molten at a temperature of 1200–1300° C. for two hours in an electric furnace. Thereafter, the temperature was lowered, and each sample was kept the heat in the furnace at each temperature of 950° C., 900° C., 850° C., and 800° C. for 24 hours. Thereafter, the samples were taken out of the furnace, and then observed by a microscope about the presence or absence of the devitrification. The results of the observation are shown. By the observation, a glass in which no devitrification is observed is indicated by a circle mark, a glass in which devitrification is observed only on a surface is indicated by a triangle mark, and a glass in which devitrification is observed inside is indicated by a cross mark.

For the temperature at which the glass melt has predetermined viscosity, while the viscosity was measured by a platinum sphere drawing method, the temperature of the glass melt was measured when the viscosity η (poise) became log η=1.5 and 2.5. A cross mark expresses a point where the measurement of the viscosity was impossible because of severe devitrification of the glass melt.

TABLE 1

| | Examples No. | | | | | | | | |
|---|---|---|---|---|---|---|---|---|---|
| | 1 | 2 | 3 | 4 | 5 | 6 | 7 | 8 | 9 |
| Glass Composition (Weight %) | | | | | | | | | |
| ① $SiO_2$ | 10.00 | 10.00 | 12.00 | 12.00 | 14.00 | 15.00 | 15.00 | 16.00 | 16.00 |
| ② $B_2O_3$ | 28.00 | 32.00 | 30.00 | 24.00 | 26.00 | 35.00 | 23.00 | 27.00 | 31.00 |
| ③ $La_2O_3$ | 20.00 | 15.00 | 21.00 | 10.00 | 10.00 | 15.00 | 11.00 | 15.00 | 18.00 |
| ④ $Y_2O_3$ | 12.00 | 13.00 | 15.00 | 8.50 | 10.00 | 8.00 | 9.00 | 10.00 | 6.00 |
| ⑤ $Gd_2O_3$ | | 1.00 | 4.00 | 10.00 | | 5.00 | 3.00 | | |
| ⑥ $ZrO_2$ | 2.30 | 8.00 | | | | 3.20 | 2.50 | 2.40 | 4.50 |
| ⑦ $Ta_2O_5$ | 10.00 | 1.90 | 1.00 | 2.00 | 1.90 | 3.00 | 2.90 | 2.00 | 1.50 |
| ⑧ ZnO | | | 4.50 | | 0.50 | | 3.00 | | 2.00 |
| ⑨ CaO | 10.00 | 15.00 | 8.00 | 5.00 | 20.00 | 10.00 | 12.00 | 11.00 | 9.00 |

TABLE 1-continued

|  |  |  |  |  |  |  |  |  |  |
|---|---|---|---|---|---|---|---|---|---|
| ⑩ SrO |  |  | 2.00 |  | 5.00 |  | 3.00 | 5.00 | 7.00 |
| ⑪ BaO | 4.00 |  |  | 20.00 | 9.50 |  | 12.00 | 8.00 | 2.00 |
| ⑫ Li$_2$O | 3.50 | 4.00 | 2.50 | 8.00 | 3.00 | 5.00 | 3.50 | 3.50 | 3.00 |
| ⑬ Sb$_2$O$_3$ |  | 0.20 | 0.10 |  | 0.50 | 0.10 | 0.80 | 0.10 | 0.10 |
| ⑭ As$_2$O$_3$ |  |  |  |  |  |  |  |  |  |
| Total | 100.00 | 100.00 | 100.00 | 100.00 | 100.00 | 100.00 | 100.00 | 100.00 | 100.00 |
| ① + ② | 38.00 | 42.00 | 42.00 | 36.00 | 40.00 | 50.00 | 38.00 | 43.00 | 47.00 |
| ③ + ④ + ⑤ | 32.00 | 29.00 | 40.00 | 28.50 | 20.00 | 28.00 | 23.00 | 25.00 | 24.00 |
| ⑧ + ⑨ + ⑩ + ⑪ | 14.00 | 15.00 | 14.50 | 25.00 | 35.00 | 10.00 | 30.00 | 24.00 | 20.00 |
| ④ + ⑦ + ⑨ | 32.00 | 29.90 | 24.00 | 15.00 | 31.90 | 21.00 | 23.90 | 23.00 | 16.50 |

|  |  | Examples No. |  |  |  |  |  |
|---|---|---|---|---|---|---|---|
|  |  | 10 | 11 | 12 | 13 | 14 | 15 |
| Glass Composition (Weight %) |  |  |  |  |  |  |  |
| ① SiO$_2$ |  | 17.00 | 17.00 | 18.00 | 20.00 | 20.00 | 15.99 |
| ② B$_2$O$_3$ |  | 28.50 | 23.00 | 24.00 | 29.00 | 23.00 | 26.69 |
| ③ La$_2$O$_3$ |  | 21.00 | 10.00 | 13.00 | 20.00 | 15.00 | 15.00 |
| ④ Y$_2$O$_3$ |  | 7.00 | 5.00 | 10.00 | 5.00 | 12.00 | 10.00 |
| ⑤ Gd$_2$O$_3$ |  | 3.00 |  | 9.00 |  |  |  |
| ⑥ ZrO$_2$ |  |  | 0.50 |  |  | 0.80 | 2.50 |
| ⑦ Ta$_2$O$_5$ |  | 3.50 | 6.00 | 2.40 | 1.30 | 1.60 | 2.00 |
| ⑧ ZnO |  | 0.90 | 10.00 |  | 8.00 |  |  |
| ⑨ CaO |  | 16.00 | 5.00 | 5.50 | 13.00 | 8.00 | 11.30 |
| ⑩ SrO |  |  | 20.00 | 14.00 | 1.00 | 10.00 | 5.00 |
| ⑪ BaO |  |  |  |  |  | 3.00 | 8.00 |
| ⑫ Li$_2$O |  | 3.00 | 2.50 | 4.00 | 2.50 | 6.50 | 3.50 |
| ⑬ Sb$_2$O$_3$ |  | 0.10 | 1.00 | 0.10 | 0.20 | 0.10 | 0.02 |
| ⑭ As$_2$O$_3$ |  |  |  |  |  |  |  |
| Total |  | 100.00 | 100.00 | 100.00 | 100.00 | 100.00 | 100.00 |
| ① + ② |  | 45.50 | 40.00 | 42.00 | 49.00 | 43.00 | 42.68 |
| ③ + ④ + ⑤ |  | 31.00 | 15.00 | 32.00 | 25.00 | 27.00 | 25.00 |
| ⑧ + ⑨ + ⑩ + ⑪ |  | 16.90 | 35.00 | 19.50 | 22.00 | 21.00 | 24.30 |
| ④ + ⑦ + ⑨ |  | 26.50 | 16.00 | 17.90 | 19.30 | 21.60 | 23.30 |

TABLE II

|  | Examples No. | | | | | | | | | | | | | | |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| nd | 1.727 | 1.705 | 1.699 | 1.660 | 1.667 | 1.667 | 1.702 | 1.677 | 1.675 | 1.683 | 1.684 | 1.700 | 1.663 | 1.664 | 1.677 |
| υd | 51.8 | 52.2 | 56.2 | 54.6 | 58.3 | 58.3 | 50.8 | 55.1 | 55.4 | 56.3 | 52.9 | 53.8 | 56.9 | 55.9 | 54.9 |
| Tg (° C.) | 546 | 519 | 559 | 480 | 531 | 519 | 538 | 550 | 556 | 568 | 572 | 507 | 579 | 498 | 550 |
| Devitrification Test |  |  |  |  |  |  |  |  |  |  |  |  |  |  |  |
| 1000° C. × 24 hr | ○ | ○ | ○ | ○ | ○ | ○ | ○ | ○ | ○ | ○ | ○ | ○ | ○ | ○ | ○ |
| 950° C. × 24 hr | ○ | ○ | ○ | ○ | ○ | ○ | ○ | ○ | ○ | ○ | ○ | ○ | ○ | ○ | ○ |
| 900° C. × 24 hr | ○ | ○ | ○ | ○ | ○ | ○ | ○ | ○ | ○ | ○ | ○ | ○ | ○ | ○ | ○ |
| 850° C. × 24 hr | ○ | ○ | ○ | ○ | ○ | ○ | ○ | ○ | ○ | ○ | ○ | ○ | ○ | ○ | ○ |
| 800° C. × 24 hr | ○ | ○ | Δ | ○ | ○ | ○ | ○ | ○ | ○ | Δ | ○ | ○ | Δ | ○ | ○ |
| Temperature (° C.)* |  |  |  |  |  |  |  |  |  |  |  |  |  |  |  |
| log η = 1.5 | 936 | 923 | 961 | 881 | 958 | 900 | 950 | 945 | 953 | 967 | 955 | 920 | 960 | 906 | 940 |
| log η = 2.5 | 859 | 849 | 879 | 809 | 870 | 821 | 860 | 866 | 871 | 890 | 882 | 839 | 895 | 821 | 859 |

*Temperature (° C.) of glass melt when the glass melt has determined viscosity

TABLE 3

| | Comparative Examples No. | | | | | |
|---|---|---|---|---|---|---|
| | 1 | 2 | 3 | 4 | 5 | 6 |
| Glass Composition (Weight %) | | | | | | |
| ① $SiO_2$ | 13.00 | 15.00 | 13.00 | 7.00 | 16.00 | 20.00 |
| ② $B_2O_3$ | 36.00 | 35.00 | 30.00 | 36.00 | 26.50 | 30.00 |
| ③ $La_2O_3$ | 23.00 | 15.00 | 28.00 | 30.00 | 21.00 | 19.00 |
| ④ $Y_2O_3$ | 11.00 | 3.00 | 10.00 | 5.00 | | |
| ⑤ $Gd_2O_3$ | | | | | | |
| ⑥ $ZrO_2$ | | | 1.30 | 5.00 | 2.50 | |
| ⑦ $Ta_2O_5$ | | | | | 5.00 | 1.00 |
| ⑧ ZnO | 3.00 | | 2.00 | 4.00 | | 10.00 |
| ⑨ CaO | 10.00 | 15.00 | 9.00 | 6.00 | 12.00 | |
| ⑩ SrO | | 11.00 | | | 13.50 | 16.00 |
| ⑪ BaO | | | 2.00 | 4.00 | | |
| ⑫ $Li_2O$ | 4.00 | 6.00 | 4.00 | 3.00 | 3.50 | 4.00 |
| ⑬ $Sb_2O_3$ | 0.00 | | | | | |
| ⑭ $As_2O_3$ | | | | 0.70 | | |
| Total | 100.00 | 100.00 | 100.00 | 100.00 | 100.00 | 100.00 |
| ① + ② | 49.00 | 50.00 | 43.00 | 43.00 | 42.50 | 50.00 |
| ③ + ④ + ⑤ | 34.00 | 18.00 | 38.00 | 35.50 | 21.00 | 28.00 |
| ⑧ + ⑨ + ⑩ + ⑪ | 13.00 | 26.00 | 13.50 | 14.00 | 25.50 | 10.00 |
| ④ + ⑦ + ⑨ | 21.00 | 18.90 | 29.00 | 11.00 | 17.00 | 21.00 |
| nd | 1.660 | 1.645 | 1.687 | 1.695 | 1.678 | 1.662 |
| υd | 56.3 | 58.9 | 54.7 | 54.5 | 54.5 | 55.7 |
| Tg (° C.) | 564 | 523 | 558 | 567 | 531 | 514 |
| Devitrification Test | | | | | | |
| 1000° C. × 24 hr | ○ | ○ | ○ | ○ | ○ | ○ |
| 950° C. × 24 hr | Δ | Δ | Δ | Δ | X | X |
| 900° C. × 24 hr | X | X | X | X | X | X |
| 850° C. × 24 hr | X | X | X | X | X | X |
| 800° C. × 24 hr | X | X | X | X | X | X |
| Temperature (° C.)‡ | | | | | | |
| log η = 1.5 | 923 | 909 | 919 | 939 | 940 | 931 |
| log η = 2.5 | X | X | X | X | X | X |

‡Temperature (° C.) of glass melt when the glass melt has determined viscosity

As shown in Table 1, all the glasses of examples of the present invention have the desired optical constants and the low glass transformation point (Tg) within the range of from 480–580° C., so that these are suitable for the precision press molding.

As obvious from the results of the devitrification tests and the results of the measurement of the temperature of the glass melt when the viscosity η (poise) thereof became log η=1.5 and 2.5, the conventional optical glasses as shown in Table 3 devitrify at the temperature when the viscosity η (poise) of the glass melt is log η=1.5. When the viscosity η (poise) of the glass melt is log η=2.5, the viscosity cannot be measured because of the devitrification.

On the contrary, with all the glasses of examples according to the present invention, the temperature when the glass melt becomes log η=2.5 is higher than the devitrification temperature, so that very little devitrification occurs during the forming of the preform.

With many glasses of examples, because the temperature when the glass melt becomes log η=1.5 is not more than about 950° C., the forming of the preform material can be carried out under a heat-resistant temperature of the mold within the range of log η equal from 1.5 to 2.5.

That is, the optical glasses of the examples according to the present invention generate no devitrification within the working temperature range during the forming of the preform material, and have excellent resistance to devitrification property. Thus, all of them are the most suitable for forming of the preform material by dropping the glass melt.

INDUSTRIAL APPLICABILITY

As described above, the optical glass for precision press molding according to the present invention comprises a lanthanum borosilicate system glass having optical constants of refractive index (nd) within a range from 1.65 to 1.73 and Abbe number (vd) within a range from 50 to 60, and a glass transformation point (Tg) of within a range of 480–580° C. Furthermore, the optical glass for precision press molding has a devitrification temperature that is lower than a temperature of a glass melt when the glass melt has a viscosity η (poise) of log η=2.5. Thus, no devitrification occurs in the glass within the range of log η equal from 1.5 to 2.5 that is suitable viscosity η (poise) of the glass melt for producing the preform material for precision press molding by the dropping method. Furthermore, the optical glass for precision press molding according to the present invention is free of unsuitable component (PbO, $F_2$ or the like) for the optical glass for precision press molding. Therefore, the optical glass for precision press molding according to the present invention is the most suitable for forming of the preform material and for the precision press molding.

What is claimed is:

1. An optical glass for precision press molding consisting of a lanthanum borosilicate system glass having:

optical constants of refractive index (nd) within a range from 1.65 to 1.73 and Abbe number (vd) within a range from 50 to 60; and a glass transformation point (Tg) within a range of 480–580° C.;

wherein the devitrification temperature of the glass is less than the temperature at which the glass has a viscosity, η, in poise corresponding to log η=2.5;

in which the devitrification temperature is defined as the temperature at which crystallite occurs on at least one of the surface of the glass or within the glass after the glass is cooled from a temperature in which the melt is transparent; and the optical glass is free from $F_2$ component.

2. The optical glass for precision press molding as claimed in claim 1, consisting of the following composition in weight percent of:

| | |
|---|---|
| $SiO_2$ | 10–20% |
| $B_2O_3$ | 23–35% |
| $SiO_2 + B_2O_3$ | 36–50% |
| $La_2O_3$ | 10–21% |
| $Y_2O_3$ | 5–15% |
| $Gd_2O_3$ | 0–10% |
| $La_2O_3 + Y_2O_3 + Gd_2O_3$ | 15–40% |
| $Ta_2O5$ | 1–10% |
| $ZrO_2$ | 0–8% |
| CaO | 5–20% |
| ZnO | 0–10% |
| SrO | 0–20% |
| BaO | 0–20% |
| ZnO + CaO + SrO + BaO | 10–35% |
| $Y_2O_3 + Ta_2O_5 + CaO$ | not less than 14% |
| $Li_2O$ | 2.5–8% |
| $Sb_2O_3$ | 0–1%. |

3. The optical glass for precision press molding as claimed in claim 2, wherein the optical glass is essentially free of PbO component.

4. The optical glass for precision press molding as claimed in claim 2, wherein the optical glass is essentially free of $Al_2O_3$, MgO, $Na_2O$, and $K_2O$ components.

5. The optical glass for precision press molding as claimed in claim 1, consisting of the following composition in weight percent of:

| | |
|---|---|
| $SiO_2$ | 10–20% |
| $B_2O_3$ | 23–35% |
| $SiO_2 + B_2O_3$ | 36–50% |
| $La_2O_3$ | 10–18% |
| $Y_2O_3$ | 5–15% |
| $Gd_2O_3$ | 0–10% |
| $La_2O_3 + Y_2O_3 + Gd_2O_3$ | 15–40% |
| $Ta_2O_5$ | 1–10% |
| $ZrO_2$ | 0–8% |
| CaO | 5–20% |
| ZnO | 0–10% |
| SrO | 0–20% |
| BaO | 0–20% |
| ZnO + CaO + SrO + BaO | 10–35% |
| $Y_2O_3 + Ta_2O_5 + CaO$ | not less than 14% |
| $Li_2O$ | 2.5–8% |
| $Sb_2O_3$ | 0–1%. |

6. The optical glass for precision press molding as claimed in claim 5, wherein the optical glass is essentially free of PbO component.

7. The optical glass for precision press molding as claimed in claim 5, wherein the optical glass is essentially free of $Al_2O_3$, MgO, $Na_2O$, and $K_2O$ components.

8. The optical glass for precision press molding as claimed in claim 1, wherein the optical glass is free of PbO component.

9. The optical glass for precision press molding as claimed in claim 1, wherein three components of $Y_2O_3$, $Ta_2O_5$, and CaO components coexist in the optical glass.

10. The optical glass for precision press molding as claimed in claim 1, wherein the optical glass is free of $Al_2O_3$, MgO, $Na_2O$, and $K_2O$ components.

11. An optical element being obtained by precision press molding an optical glass consisting of a lanthanum borosilicate system glass having: optical constants of refractive index (nd) within a range from 1.65 to 1.73 and Abbe number (vd) within a range from 50 to 60; and a glass transformation point (Tg) within a range of 480–580° C.;

wherein the devitrification temperature of the glass is less than the temperature at which the glass has a viscosity, η, in poise corresponding to log η=2.5;

in which the devitrification temperature is defined as the temperature at which crystallite occurs on at least one of the surface of the glass or within the glass after the glass is cooled from a temperature in which the melt is transparent; and the optical glass is free from $F_2$ component.

12. The optical element as claimed in claim 11, wherein the optical glass is free of PbO component.

13. The optical element as claimed in claim 11, wherein three components of $Y_2O_3$, $Ta_2O_5$, and CaO components coexist in the optical glass.

14. The optical element as claimed in claim 11, wherein the optical glass is free of $Al_2O_3$, MgO, $Na_2O$, and $Ka_2O$ components.

* * * * *

UNITED STATES PATENT AND TRADEMARK OFFICE
CERTIFICATE OF CORRECTION

PATENT NO. : 6,713,419 B1
DATED : March 30, 2004
INVENTOR(S) : Masahiro Onozawa and Takehiro Sakamoto It is certified that error appears in the above-identified patent and that said Letters Patent is hereby corrected as shown below:

<u>Columns 13-14,</u>
Claims 3, 4, 6 and 7, are canceled; and

<u>Column 13,</u>
Line 30, composition listing, "Ta$_2$O5" should read -- Ta$_2$O$_5$ --.

Signed and Sealed this

Tenth Day of August, 2004

JON W. DUDAS
*Acting Director of the United States Patent and Trademark Office*